US008577581B2

(12) United States Patent
Hirota et al.

(10) Patent No.: US 8,577,581 B2
(45) Date of Patent: Nov. 5, 2013

(54) INJECTOR PROTECTION CONTROL METHOD AND COMMON RAIL FUEL INJECTION CONTROL SYSTEM

(75) Inventors: Shinichi Hirota, Saitama (JP); Tomonori Watanabe, Saitama (JP)

(73) Assignee: Bosch Corporation, Tokyo (JP)

( * ) Notice: Subject to any disclaimer, the term of this patent is extended or adjusted under 35 U.S.C. 154(b) by 993 days.

(21) Appl. No.: 12/597,519

(22) PCT Filed: Apr. 23, 2008

(86) PCT No.: PCT/JP2008/057824
§ 371 (c)(1), (2), (4) Date: Dec. 16, 2009

(87) PCT Pub. No.: WO2008/136320
PCT Pub. Date: Nov. 13, 2008

(65) Prior Publication Data
US 2010/0088009 A1 Apr. 8, 2010

(30) Foreign Application Priority Data
Apr. 26, 2007 (JP) ................................ 2007-117054

(51) Int. Cl.

| | |
|---|---|
| ***B60T 7/12*** | (2006.01) |
| ***G05D 1/00*** | (2006.01) |
| ***G06F 7/00*** | (2006.01) |
| ***G06F 17/00*** | (2006.01) |
| ***F02B 77/08*** | (2006.01) |
| ***F02M 17/30*** | (2006.01) |
| ***F02D 17/00*** | (2006.01) |

(52) U.S. Cl.
USPC ....................................... 701/104; 123/198 D

(58) Field of Classification Search
USPC .............. 73/114.45; 123/198 D, 339.15, 479; 701/104, 107, 114; 702/182, 183, 185
See application file for complete search history.

(56) References Cited

U.S. PATENT DOCUMENTS 7,363,918 B2 * 4/2008 Majima ......................... 123/514
7,500,469 B2 * 3/2009 Akita ............................ 123/431
(Continued)

FOREIGN PATENT DOCUMENTS

JP 1054267 A 2/1998
JP 2003278586 A 10/2003
(Continued)

*Primary Examiner* — Stephen K Cronin
*Assistant Examiner* — Sizo Vilakazi
(74) *Attorney, Agent, or Firm* — Michael Best & Friedrich LLP

(57) ABSTRACT

To reliably prevent a drop in the function of injectors resulting from a rise in the temperature of excess fuel in the injectors without having to add a new part.

In a common rail fuel injection control system according to the present invention, when it is determined that an engine rotational speed Ne, a vehicle velocity V and a rail pressure exceed respective predetermined references, the count value of a determining counter is increased (steps S100 to S106), and when it is determined that the engine rotational speed Ne, the vehicle velocity V and the rail pressure do not exceed the respective predetermined references, the count value of the determining counter is decreased (steps S108 to S114), and next, when it is determined (step S116) that the count value of the determining counter exceeds a predetermined protection initiation reference Cs, limitation of the fuel injection amount and the rail pressure and correction of a smoke limit value are performed (see steps S120 to S124) until the count value of the determining counter falls below the predetermined protection initiation reference, whereby injector protection is performed.

18 Claims, 3 Drawing Sheets

(56) References Cited

U.S. PATENT DOCUMENTS

| | | | | |
|---|---|---|---|---|
| 7,873,461 | B2 * | 1/2011 | McDonald et al. | 701/104 |
| 2007/0101972 | A1 * | 5/2007 | Majima | 123/458 |

FOREIGN PATENT DOCUMENTS

| | | | |
|---|---|---|---|
| JP | 200629288 | A | 2/2006 |
| JP | 2006291922 | A | 10/2006 |

* cited by examiner

INJECTOR PROTECTION CONTROL METHOD AND COMMON RAIL FUEL INJECTION CONTROL SYSTEM

BACKGROUND OF THE INVENTION

1. Field of the Invention

The present invention pertains to common rail fuel injection control and particularly relates to the improvement and the like of the reliability of a system resulting from the protection of injectors.

2. Description of the Related Art

Conventionally, as this type of system, a common rail fuel injection system that is configured to pressure-feed high pressure fuel to a common rail by a high pressure pump, supply the high pressure fuel that has been pressure-accumulated in the common rail to injectors that are disposed in correspondence to cylinders, and inject the high pressure fuel at a predetermined timing to the corresponding cylinders of an internal combustion engine from each of the injectors is disclosed in JP-A-2003-278586 and the like and is well known.

In this common rail fuel injection system, it is normal to return excess fuel inside the injectors to a fuel tank after injection, and that kind of configuration is employed even in the conventional system disclosed in the aforementioned published application and the like.

However, the excess fuel in the injectors that has not been used in injection as mentioned above obtains thermal energy and reaches a high temperature state because of pressure fluctuation resulting from a sudden drop in pressure after injection inside the injectors. Normally, as for injector head portions, the disposed positions and the like of the injectors is considered such that the excess fuel temperature does not rise above a constant by air cooling resulting from traveling wind or the like. However, realistically, although it is extremely difficult to assume the occurrence of a situation where air cooling by traveling wind or the like becomes insufficient for whatever reason and the flow of the wind temporarily ceases, it cannot be said for sure that the occurrence of such a situation is theoretically nonexistent.

Additionally, in that kind of state, when return of the excess fuel such as mentioned previously is performed, it is conceivable for this to lead to an abnormal rise in the fuel temperature and for there to be a drop in the function of the injectors; therefore, it is theoretically conceivable for this to lead to a situation where vehicle operation stops, and from the standpoint of further improvement of the safety and the reliability of the vehicle, it is preferable to take coping measures that will be sufficient even in a situation where the potential for this theoretical occurrence is predicted, and a vehicle with higher safety and higher reliability is desired.

Incidentally, in the conventional system disclosed in the previous published application, a measure is disclosed which, when a temperature of the injectors that exceeds a predetermined value is detected, suppresses an excessive rise in the injector temperature, improves the thermal reliability of the system and therefore prevents a decrease in the injection amount and a drop in the output resulting from an excessive rise in the injector temperature by controlling an energizing electric current to the injectors and the like.

This measure is capable of becoming one means for solving the aforementioned problem in that the measure suppresses a rise in the injector temperature, but it is necessary to newly dispose a sensor that detects the temperature of the injectors, and in a vehicle where simplification of the configuration and a reduction in the number of parts and the like are required as much as possible, the addition of new parts, such as even one sensor, is decidedly not expedient.

Given this, there is desired a measure that can reliably prevent a drop in the function of the injectors resulting from a rise in the temperature of the excess fuel and improves the reliability of the system without having to add a new part and without having to directly detect the temperature of the injectors.

SUMMARY OF THE INVENTION

The present invention has been made in view of these circumstances and provides an injector protection control method and a common rail fuel injection control system that can reliably prevent a drop in the function of injectors resulting from a rise in the temperature of excess fuel in the injectors without having to add a new part.

According to a first aspect of the present invention, there is provided an injector protection control method in a common rail fuel injection control system, the method comprising:

periodically determining whether or not one or plural judgment indicators that have been determined beforehand exceed respective predetermined references and, each time the determination result is obtained, increasing/decreasing a count value of a determining counter in accordance with the determination result, determining whether or not the count value after the increase/decrease exceeds a predetermined protection initiation reference, and when the count value exceeds the predetermined protection initiation reference, determining whether or not the fuel temperature exceeds a predetermined protection initiation temperature, and when the fuel temperature exceeds the predetermined protection initiation temperature, performing limitation of the fuel injection amount and the rail pressure until the count value falls below the predetermined protection initiation reference.

According to a second aspect of the present invention, there is provided a common rail fuel injection control system that is configured such that fuel inside a fuel tank is pressurized and pressure-fed by a high pressure pump and accumulated in a common rail and the high pressure fuel is supplied to injectors that are connected to the common rail to enable fuel injection by the injectors and which includes an electronic control unit that controls operation of the high pressure pump and the injectors, wherein the electronic control unit is configured to periodically determine whether or not one or plural judgment indicators that have been determined beforehand exceed respective predetermined references and, each time the determination result is obtained, increase/decrease a count value of a determining counter in accordance with the determination result, determine whether or not the count value after the increase/decrease exceeds a predetermined protection initiation reference, and when it is determined that the count value exceeds the predetermined protection initiation reference, determine whether or not the fuel temperature exceeds a predetermined protection initiation temperature, and when it is determined that the fuel temperature exceeds the predetermined protection initiation temperature, perform limitation of the fuel injection amount and the rail pressure until the count value falls below the predetermined protection initiation reference.

DETAILED DESCRIPTION OF THE PREFERRED EMBODIMENTS

Figure 1:
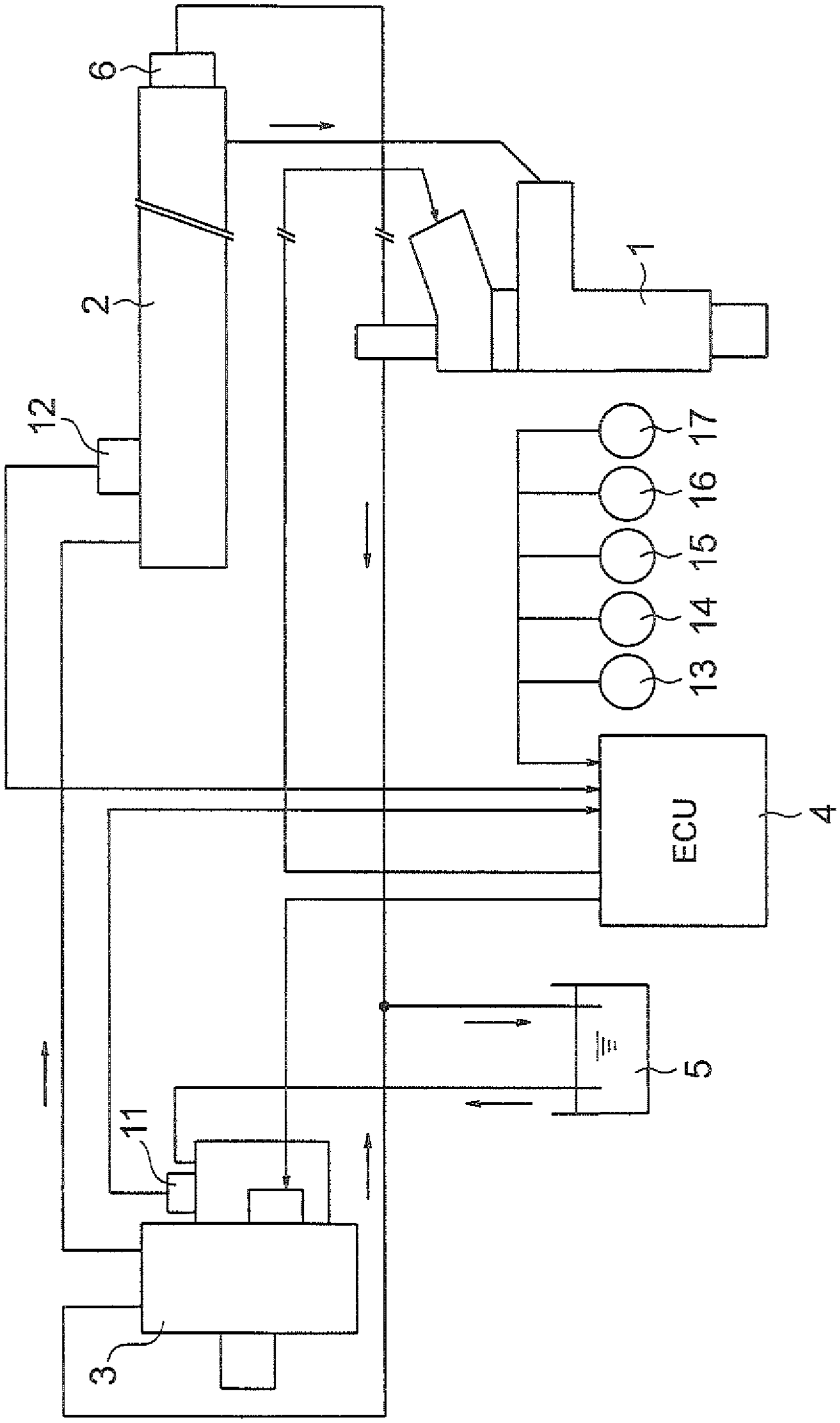
FIG. 1 is a configural diagram showing a configural example of a common rail fuel injection control system of an embodiment of the present invention.

Below, an embodiment of the present invention will be described with reference to FIG. 1 to FIG. 3.

It will be noted that the members and arrangements described below are not intended to limit the present invention and can be variously modified within the scope of the gist of the present invention.

First, a configural example of a common rail fuel injection control system to which an injector protection control method of the embodiment of the present invention is applied will be described with reference to FIG. 1.

The common rail fuel injection control system of the embodiment of the present invention is configured, using as main configural elements, injectors 1 that inject and supply fuel to cylinders of an unillustrated diesel engine, a common rail 2 that accumulates the high pressure fuel that is supplied to the injectors 1, a high pressure pump 3 that performs pressure-feeding of the high pressure fuel to this common rail 2, and an electronic control unit 4 that controls operation of the injectors 1 and the high pressure pump 3, and the basic configuration of the common rail fuel injector control system is conventionally well known.

The fuel is supplied from a fuel tank 5 to the high pressure pump 3, and the high pressure pump 3 compresses and pressure-feeds that fuel to the common rail 2.

The injectors 1 are disposed in correspondence to each of the cylinders of the unillustrated diesel engine and are pipe-connected to the common rail 2 such that the high pressure fuel from the common rail 2 is supplied to the injectors 1.

A discharge opening (not shown) is disposed in the common rail 2 order to return excess fuel in the common rail 2 that has risen equal to or higher in than a predetermined pressure to the fuel tank 5, a relief valve 6 is attached to the common rail 2, and this relief valve 6 is pipe-connected to the fuel tank 5 together with escape openings (not shown) of excess fuel in the injectors 1.

The electronic control unit (notated as "ECU" in FIG. 1) 4 performs control of the operation of the high pressure pump 3 and the injectors 1 and is configured to execute later-described injector protection control processing as part of that control. This electronic control unit 4 is, for example, configured to include a microprocessor, storage elements such as a RAM and a ROM, and an input/output interface (not shown).

Detection signals of various sensors, such as a fuel temperature sensor 11, a rail pressure sensor 12, a crank angle sensor 13, a cam angle sensor 14, a water temperature sensor 15, an outside air temperature sensor 16 and a vehicle velocity sensor 17, are inputted to the electronic control unit 4 of the embodiment of the present invention for operation control such as the later-described injector protection control processing.

It will be noted that these sensors are sensors that are normally attached for electronic control of the vehicle and not sensors that become newly necessary for the injector protection control of the present invention, and are sensors for which it is alright to appropriate their output signals.

Here, the fuel temperature sensor 11 is for detecting the temperature of the fuel that is pressure-feed from the high pressure pump 3, or in other words, for detecting the temperature of excess fuel that has been returned to the fuel tank 5 from the common rail 2 and the injectors 1, and the fuel temperature sensor 11 is attached to an appropriate place on an inlet portion of the high pressure pump 3.

The rail pressure sensor 12 is for detecting the pressure inside the common rail 2 and is attached to an appropriate place on the common rail 2.

The crank angle sensor 13 is attached to a crankshaft of the engine (not shown), detects the angle of rotation of the crankshaft, and is configured to be able to detect an engine rotational speed Ne from time intervals between the detection signals.

The cam angle sensor 14 is attached to a camshaft of the engine (not shown), detects the angle of rotation of the camshaft, and is configured to be able to determine a fuel injection time period of the injectors (e.g., each of the injectors if there are four cylinders) and a fuel pressure-feeding time period of fuel injection pumps.

The water temperature sensor 15 is attached to a cooling water circulation portion in order to detect the temperature of cooling water of the unillustrated engine and is configured to output an appropriate signal in accordance with the detected temperature.

The outside air temperature sensor 16 is for detecting the temperature outside the vehicle, is attached to an appropriate place on the vehicle body, and is configured to output an appropriate signal in accordance with the detected temperature.

The vehicle velocity sensor 17 is for detecting the traveling velocity of the vehicle, and although there are sensors with various configurations, here it is not necessary for the vehicle velocity sensor 17 to be limited to a specific configuration.

Figure 2:
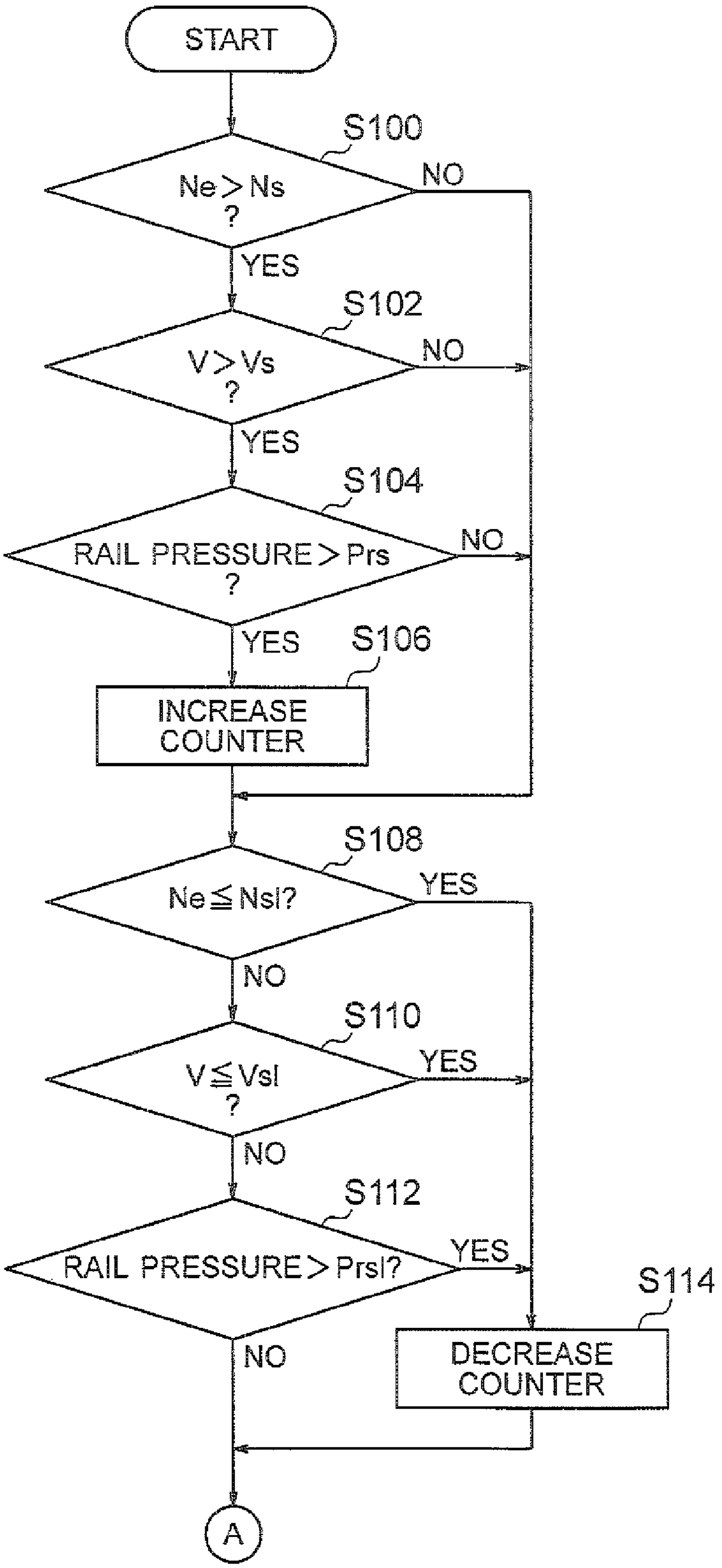
FIG. 2 is a sub-routine flowchart showing the first half of a procedure of injector protection control processing that is executed in a control unit of the common rail fuel injection control system shown in FIG. 1.
Figure 3:
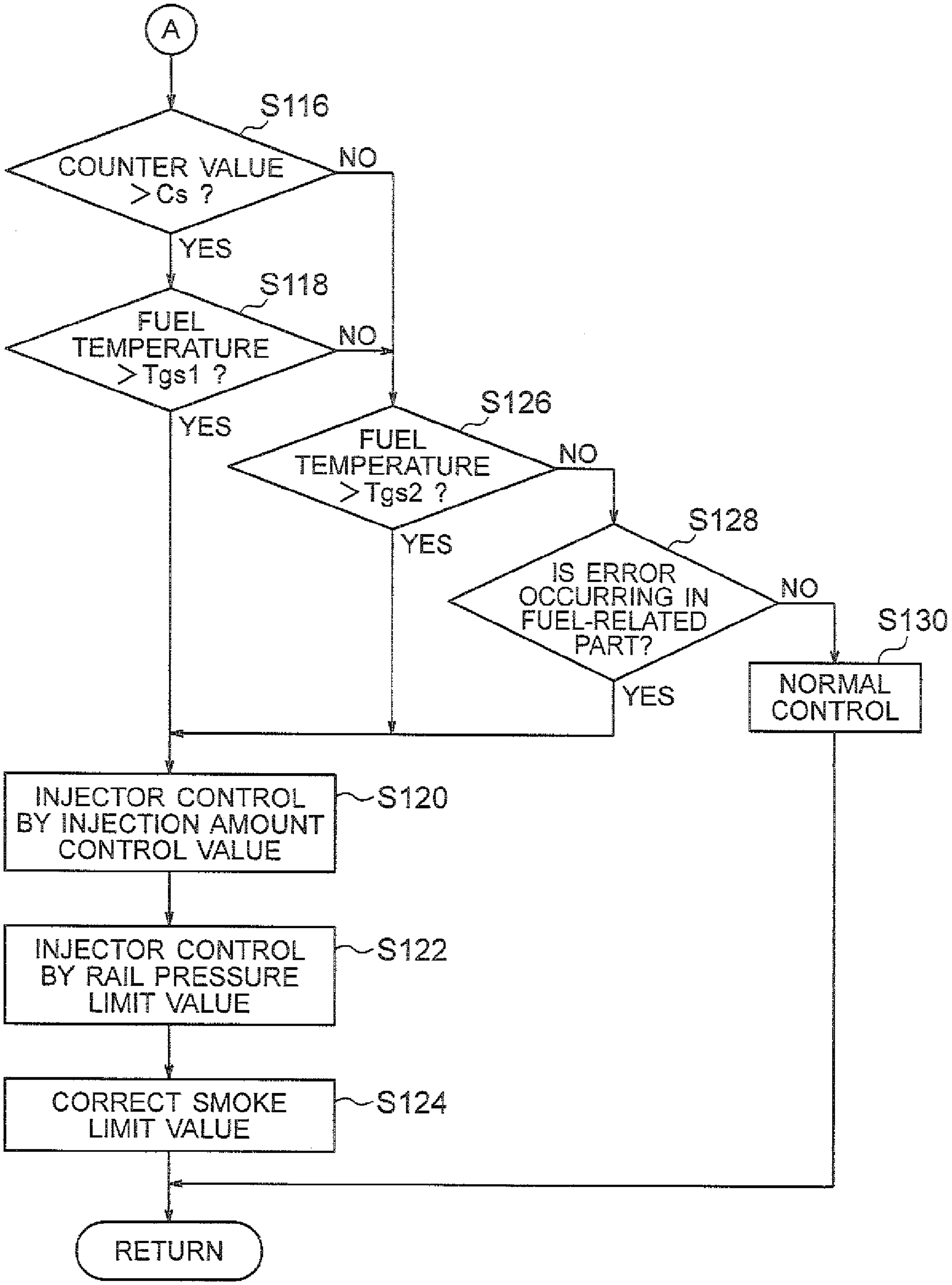
FIG. 3 is a sub-routine flowchart showing the second half of the procedure of injector protection control processing that is executed in the control unit of the common rail fuel injection control system shown in FIG. 1.

In FIG. 2 and FIG. 3, there are shown sub-routine flowcharts showing a procedure of the injector protection control processing that is executed by the electronic control unit 4, and the content thereof will be described below with reference to the same figures.

When processing is started, it is determined whether or not the engine rotational speed Ne that serves as a judgment indicator is larger than a predetermined reference value Ns (see step S100 of FIG. 2), and when it is determined that the engine rotational speed Ne is greater than the predetermined reference rotational speed Ns (Ne>Ns) (in the case of YES), the processing of next-described step S102 is executed by the electronic control unit 4, and when it is determined that Ne is not greater than Ns (in the case of NO), the processing of later-described step S108 is executed.

Here, the predetermined reference rotational speed Ns is a reference that determines whether or not the engine rotational speed is an engine rotational speed for which it is necessary to perform control for injector protection, and it is preferred that the predetermined reference rotational speed Ns is set by an experiment or a simulation. This reference rotational speed is conceptually determined from the standpoint of when the rise in the temperature of the excess fuel becomes larger and whether or not it is suitable to make the engine rotational speed into an engine rotational speed of extent that requires processing for later-described injector protection. In the embodiment of the present invention, Ns is set to be equal to 1200 rpm, for example.

It will be noted that the engine rotational speed Ne is arithmetically calculated by a predetermined arithmetic expression in the electronic control unit 4 on the basis of the detection signal of the crank angle sensor 13.

In step S102, it is determined whether or not a vehicle velocity V that serves as a judgment indicator that has been detected by the vehicle velocity sensor 17 is larger than a predetermined reference vehicle velocity Vs, and when it is determined that the vehicle velocity V is larger than the predetermined reference vehicle velocity Vs (V>Vs) (in the case of YES), the sub-routine proceeds to the processing of next-described step S104, and when it is determined that V is not larger than Vs (in the case of NO), the sub-routine proceeds to the processing of later-described step S108.

Here, the predetermined reference vehicle velocity Vs is a reference that determines whether or not the vehicle velocity is a vehicle velocity for which it is necessary to perform control for injector protection, and it is preferred that the predetermined reference vehicle velocity Vs is set by an experiment or a simulation. This reference vehicle velocity is conceptually determined from the standpoint of when the rise in the temperature of the excess fuel becomes larger and whether or not it is suitable to determine that control for later-described injector protection is necessary.

In step S104, it is determined whether or not the fuel pressure inside the common rail 2 that serves as a judgment indicator that has been detected by the rail pressure sensor 12, that is, a rail pressure Pr, is larger than a predetermined reference rail pressure Prs, and when it is determined that the rail pressure Pr is larger than the predetermined reference rail pressure Prs (Pr>Prs) (in the case of YES), the sub-routine proceeds to the processing of next-described step S106, and when it is determined that Pr is not greater than Prs (in the case of NO), the sub-routine proceeds to the processing of later-described step S108.

Here, the predetermined reference rail pressure Prs is determined by the outside air temperature. For this reason, it is preferred that, in determining the reference rail pressure Prs in accordance with the outside air temperature, for example, correlations between various outside air temperatures and reference rail pressures Prs that are appropriate in the respective outside air temperatures are mapped beforehand and stored in a predetermined storage region of the electronic control unit 4, where those maps are used to determine the reference rail pressures Prs with respect to the outside air temperature at those times. Further, it is preferred that correlations between various outside air temperature and reference rail pressures Prs that are appropriate in the respective outside air temperatures are expressed as arithmetic expressions beforehand, where those are stored in a predetermined region of the electronic control unit 4, and that those arithmetic expressions are used to determine the reference rail pressures Prs with respect to the outside air temperatures at those times. Then, the reference rail pressure Prs that is appropriate with respect to the outside air temperature that has been detected by the outside air temperature sensor 16 is determined on the basis of the maps or the like that have been stored beforehand as mentioned above.

The reason that the reference rail pressure Prs is set by the outside air temperature in this manner is to be mindful that the state of fuel injection by the injectors 1 changes depending on changes in the viscosity of the fuel because of the outside air temperature and that the rise in the temperature of the excess fuel also differs depending on that.

In step S106, the count value of a determining counter that is used to determine whether or not to execute control for injector protection is increased by a predetermined value.

In the embodiment of the present invention, when all of the previous steps S100 to S104 are determined to be YES, the count value of the determining counter is increased by a predetermined value (e.g., "1"), and when the count value exceeds a predetermined value as described later, processing for later-described injector protection is performed, and step S106 is counting processing that becomes the assumption thereof.

It will be noted that the reason that the engine rotational speed Ne, the vehicle velocity V and the rail pressure are used as mentioned above in the embodiment of the present invention as judgment indicators to execute step S106 is in consideration that these are factors that relatively largely affect the rise in the temperature of the excess fuel of the injectors 1. Of course, it is not necessary for the judgment indicators to be limited to these three, and some kind of physical is quantities that serve as other judgment indicators may also be further added to these.

Moreover, in the embodiment of the present invention, the predetermined value that is an increased amount of the counter value is determined by the water temperature of engine cooling water and the outside air temperature. For this reason, it is preferred that, for example, values that have been obtained by mapping correlations with predetermined values that are appropriate with respect to various water temperatures of the engine cooling water and outside air temperatures and individual combinations of these water temperatures of the engine cooling water and outside air temperatures or values that have been obtained as a result of being made into a predetermined arithmetic expression are stored beforehand in a predetermined storage region of the electronic control unit 4. Then, at the time when step S106 is executed, the appropriate predetermined value is determined by the map or the like that has been stored beforehand as mentioned above with respect to the water temperature of the engine cooling water and the outside air temperature that have been detected.

Next, in step S108, it is determined whether or not the engine rotational speed Ne is equal to or less than a predetermined reference rotational speed Nsl (Ne≤Nsl), and when it is determined that the engine rotational speed Ne is equal to or less than the predetermined reference rotational speed Nsl (in the case of YES), the sub-routine proceeds to the processing of later-described step S114, and when it is determined that the engine rotational speed Ne is not equal to or less than the predetermined reference rotational speed Nsl (in the case of NO), the sub-routine proceeds to the processing of next-described S110.

Here, the predetermined reference rotational speed Nsl is set so as to be in the relationship of Nsl<Ns with respect to the predetermined reference rotational speed Ns in the previous step S100. Disposing a difference in the reference rotational speeds in this manner between the case of detecting a rise in the engine rotational speed Ne (see step S100) and the case of detecting a drop in the engine rotational speed Ne (see step S108) corresponds to disposing a so-called hysteresis; thus, stability of determination operation around the reference rotational speeds is ensured.

In step S110, it is determined whether or not the vehicle velocity V is equal to or less than a predetermined reference vehicle velocity Vsl, and when it is determined that the vehicle velocity V is equal to or less than the predetermined reference vehicle velocity Vsl (V≤Vsl) (in the case of YES), the sub-routine proceeds to the processing of later-described step S114, and when it is determined that V is not equal to or less than Vsl (in the case of NO), the sub-routine proceeds to the processing of next-described step S112.

Here, the predetermined reference vehicle velocity Vsl is set so as to be in the relationship of Vsl<Vs with respect to the predetermined reference vehicle velocity Vs in the previous step S102, and this corresponds to disposing a hysteresis in the determination references in the same manner as in case of the previous reference rotational speeds (see step S108).

In step S112, it is determined whether or not the rail pressure Pr is equal to or less than a predetermined reference rail pressure Prsl, and when it is determined that the rail pressure Pr is equal to or less than the predetermined reference rail pressure Prsl (Pr≤Prsl) (in the case of YES), the sub-routine proceeds to the processing of next-described step S114, and when Pr is not equal to or less than Prsl (in the case of NO), the sub-routine process to the processing of later-described step S116 (see FIG. 3).

Here, the predetermined reference rail pressure Prsl is set so as to be in the relationship of Prsl<Prs with respect to the predetermined reference rail pressure Prs in the previous step S104, and this corresponds to disposing a hysteresis in the determination references in the same manner as in the case of the previous reference rotational speeds (see step S108).

In step S114, the count value of the determining counter that has been described in step S106 is decreased by a predetermined value (e.g., "1"). The count value of the counter is, conversely from the case of the previous step S106, decreased because it is determined that the need to execute control for injector protection has become lower as a result of it being determined in any of steps S108, S110 and S112 that the value is equal to or less than the reference value.

It will be noted that the predetermined value by which the counter value is decreased is variously set in accordance with the water temperature of the engine cooling water and the outside air temperature as has been described previously in step S106.

Next, in step S116 (see FIG. 3), it is determined whether or not the count value of the determining counter is larger than a predetermined value Cs that serves as a protection initiation reference, and when it is determined that the count value of the determining counter is larger than the predetermined value Cs (counter value>Cs) (in the case of YES), the sub-routine proceeds to the processing of next-described step S118, and when it is determined that the count value of the determining counter is not larger than the predetermined value Cs (in the case of NO), the sub-routine proceeds to the processing of later-described step S126.

It will be noted that, as a case where the count value of the determining counter exceeds the predetermined value Cs, a case is conceivable where, for example, in winter, the temperature of the excess fuel in the injectors 1 rises abnormally due to the radiator grille becoming covered with snow on its mainline and freezing such that the outside air becomes unable to flow into the engine room.

The predetermined value Cs that serves as a protection initiation reference in this step S116 differs depending on the size and the rail pressure of the common rail 2 and is not limited to a specific value; an optimum value should be determined in accordance with the operating conditions and the like of individual fuel injection control systems.

Further, it is more preferred that the predetermined value Cs is one in which a hysteresis has been set.

That is, by disposing a predetermined value Cs1 (first protection initiation reference) in a case where step S116 is executed with the increase of the count value in the previous step S106 being executed and without the decrease of the count value in step S114 being executed and, conversely from this, a predetermined value Cs2 (second protection initiation reference) in a case where the decrease of the count value in step S114 is executed without the increase of the count value in the previous step S106 being executed, and with Cs1>Cs2, stability of operation can be ensured, which is preferred.

In step S118, it is determined whether or not the fuel temperature that has been detected by the fuel temperature sensor 11 is larger than a predetermined first reference fuel temperature Tgs1, and when it is determined that the fuel temperature is larger than the first reference fuel temperature Tgs1 (fuel temperature>Tgs1) (in the case of YES), it is determined that it is necessary to perform control for injector protection and the sub-routine proceeds to the processing of later-described step S120, and when it is determined that the fuel temperature is not larger than the first reference fuel temperature Tgs1 (in the case of NO), the sub-routine proceeds to the processing of step S126.

In this manner, in the embodiment of the present invention, when conditions of both the count value of the determining counter and the fuel temperature are satisfied, it is determined that it is necessary to perform processing for injector protection (processing from later-described S120 on), but this is for judging whether or not injector protection is necessary and not for directly detecting the temperature of the injectors 1. Additionally, because of judgment that uses the count value of the determining counter and the fuel temperature, it can be said that this is equivalent to substantially estimating, without using a temperature sensor, whether or not the temperature of the injectors 1 is in a state to an extent that it is judged that it is necessary to perform injector protection.

Here, in the embodiment of the present invention, the first reference fuel temperature Tgs1 is determined by the water temperature of the engine cooling water and the outside air temperature. That is, specifically, for example, values that have been obtained by mapping correlations of values of first reference fuel temperatures Tgs1 that are appropriate with respect to various water temperatures of the engine cooling water and outside air temperatures and individual combinations of these water temperatures of the engine cooling water and outside air temperatures or values that have been obtained as a result of being made into a predetermined arithmetic expression are stored beforehand in a predetermined storage region of the electronic control unit 4. Then, it is preferred that, at the time when step S118 is executed, the appropriate first reference fuel temperature Tgs1 is determined by the map or the like that has been stored beforehand as described above with respect to the water temperature of the engine cooling water and the outside air temperature that have been detected.

In step S126, it is determined whether or not the fuel temperature is larger than a predetermined second reference fuel temperature Tgs2, and when it is determined that the fuel temperature is larger than the second reference fuel temperature Tgs2 (fuel temperature>Tgs2) (in the case of YES), the sub-routine proceeds to the processing of later-described step S120, and when it is determined that the fuel temperature is not larger than the second reference fuel temperature Tgs2 (in the case of NO), the sub-routine proceeds to the processing of later-described step S128.

Here, the second reference fuel temperature Tgs2 is a predetermined temperature that has been set beforehand.

In the determination of whether or not to proceed to the processing of step S120, the reason that this second reference fuel temperature Tgs2 and the first reference fuel temperature Tgs1 of the previous step S118 are used is as described next.

That is, step S118 determines whether or not the excess fuel temperature is in a state where it is judged that it is necessary to perform control for injector protection when the excess fuel temperature has risen because of changes in various conditions such as the engine rotational speed, the vehicle velocity and the outside air temperature white fuel injection operation and the like is being performed normally, and the assumption is that the engine is in normal operation.

In contrast, step S126 is performed in order to judge whether or not it is necessary to perform control for injector protection from the standpoint that it is necessary to perform control for injector protection even when the excess fuel temperature has risen in a state where fuel injection and the like are not in normal operation but in some kind of abnormal operation state.

Next, in step S128, it is determined whether or not an error in a fuel-related part is occurring, and when it is determined that an error in a fuel-related part is occurring (in the case of YES), the sub-routine proceeds to the processing of next-described step S120, and when it is determined that an error in a fuel-related part is not occurring (in the case of NO), the sub-routine proceeds to the processing of later-described step S130.

Here, the error in a fuel-related part is determined by the electronic control unit 4. That is, in the embodiment of the present invention, although details will be omitted, the electronic control unit 4 performs determination processing as to whether or not there is an occurrence of an error or a failure in operation in regard to parts such as the various sensors relating to fuel control, such as the fuel temperature sensor 11 and the outside air temperature sensor 16, for example, and in S128, the electronic control unit 4 determines whether or not such an error or the like is occurring.

In step S120, the fuel injection amount is regulated to a predetermined limit value and fuel injection operation by the injectors 1 is performed after it has been determined in the previous step S118 that the fuel temperature is larger than Tgs1 or after it has been determined in step S126 that the fuel temperature is larger than Tgs2 or after it has been determined in step S128 that a predetermined error is occurring.

That is, because of the aforementioned series of processing, in correspondence to it having been determined that the fuel temperature is in a state that deserves performing protection of the injectors 1, the fuel injection amount by the injectors 1 is regulated to a limit value that has been arithmetically calculated from the standpoint of injector protection on the basis of the engine rotational speed and the fuel temperature, and fuel injection by the injectors 1 is performed. Here, in the calculation of the limit value, it is preferred that a predetermined arithmetic expression that has been set beforehand on the basis of an experiment or a simulation is used.

Next, in step S122, in correspondence to it having been determined by the previously mentioned series of processing that the fuel temperature is in a state that deserves performing protection of the injectors 1, fuel injection by the injectors 1 is performed such that the rail pressure does not exceed a predetermined limit value.

Here, the limit value of the rail pressure is calculated by a predetermined arithmetic expression on the basis of the engine rotational speed and the fuel temperature. Additionally, the arithmetic expression for calculating this limit value of the rail pressure is set beforehand on the basis of an experiment or a simulation.

Next, in step S124, correction with respect to a smoke limit value is performed. Here, the smoke limit value is a fuel injection amount that is set in control processing that is called a smoke limit that performs limitation of the fuel injection amount in accordance with the amount of air that is sucked into the engine (not shown) in order to prevent smoke from arising in the exhaust gas. This smoke limit is executed separately from the injector protection control shown in FIG. 2 and FIG. 3 in the electronic control unit 4 by control that is usually well known.

Whereas the previous steps S120 and S122 are performed in order to lower the fuel temperature, correction of the smoke limit value in this step S124 is performed from the standpoint of preventing the smoke limit value from deteriorating as a result of steps S120 and S122 being executed.

In the embodiment of the present invention, correction of the smoke limit value is performed by multiplying a correction coefficient that has been determined as described next with respect to the smoke limit value that is determined separately in the electronic control unit 4 as previously mentioned.

Here, the correction coefficient is determined from a predetermined map or arithmetic expression on the basis of the engine rotational speed and the difference between the limit value of the rail pressure that has been calculated in step S122 and a target value of the rail pressure in a normal control state, that is, in other words, using these values as parameters. It will be noted that it is preferred that the predetermined map and arithmetic expression are set on the basis of an experiment or a simulation in accordance with the scale and the like of the engine.

In the previous step S128, when it is determined that an error in a fuel-related part is not occurring (in the case of NO), normal control is performed (see step S130 of FIG. 3).

That is, in this case, the fuel temperature is not in a state that requires control for injector protection, so the fuel injection amount, the rail pressure and the smoke limit value are made into values that are determined by normal control processing, and fuel injection control and the like are performed.

Then, after step S124 or step S130 has been executed, the series of processing ends and the sub-routine returns to the unillustrated main routine, and after other processing has been executed, the series of processing shown in FIG. 2 and FIG. 3 is again executed.

As described above, the injector protection control method pertaining to the present invention is configured to substantially estimate a rise in the temperature of the excess fuel after injection in the injectors using the predetermined judgment indicators such that the injector protection control method performs determination as to whether or not injector protection is necessary, so protection of the injectors is performing without requiring a new part, and the injector protection control method is particularly suited for a common rail fuel injection control system.

According to the present invention, the invention is configured to substantially estimate a rise in the temperature of the excess fuel in the injectors using the predetermined judgment indicators such that the invention can determine whether or not control processing for injector protection is necessary, and, when injector protection is necessary, the invention executes regulation and the like of the fuel injection amount in fuel injection control, whereby the invention can grasp an abnormal rise in the temperature of the excess fuel that leads to a drop in the function of the injectors without having to add a new part, and, moreover, the invention executes regulation and the like of the fuel injection amount, whereby the invention can reliably protect the injectors.

What is claimed is:

1. An injector protection control method in a common rail fuel injection control system, the method comprising:

periodically determining whether or not one or plural judgment indicators that have been determined beforehand exceed respective predetermined references and, each time the determination result is obtained, increasing or decreasing a count value of a determining counter in accordance with the determination result, determining whether or not the count value after the increase or decrease exceeds a predetermined protection initiation reference, and when the count value exceeds the predetermined protection initiation reference, determining whether or not the fuel temperature exceeds a predetermined protection initiation temperature, and when the fuel temperature exceeds the predetermined protection initiation temperature, performing limitation of the fuel injection amount and the rail pressure until the count value falls below the predetermined protection initiation reference.

2. The injector protection control method according to claim 1, wherein the judgment indicators are at least engine rotational speed, vehicle velocity and rail pressure, and when these judgment indicators exceed the respective predetermined references, the method increases the count value of the determining counter, and when the judgment indicators fall below the respective predetermined references, the method decreases the count value of the determining counter.

3. The injector protection control method according to claim 2, wherein the increased or decreased value of the count value of the determining counter is determined on the basis of the outside air temperature and the water temperature of engine cooling water.

4. The injector protection control method according to claim 3, wherein the limitation of the fuel injection amount regulates fuel injection operation of injectors such that the fuel injection amount of the injectors does not exceed an injection amount limit value that is determined on the basis of the engine rotational speed and the fuel temperature, and the limitation of the rail pressure regulates operation of a high pressure pump such that the rail pressure does not exceed a rail pressure limit value that is determined on the basis of the engine rotational speed and the fuel temperature.

5. The injector protection control method according to claim 4, wherein the method performs the limitation of the fuel injection amount and the rail pressure and corrects, by a coefficient that is determined on the basis of the engine rotational speed and the difference between a target value of the rail pressure in a normal control state and the rail pressure limit value, a smoke limit value that is a fuel injection amount that is injectable as a limit value where smoke occurs.

6. The injector protection control method according to claim 5, wherein the method performs the limitation of the fuel injection amount and the rail pressure when the count value of the determining counter does not exceed the predetermined protection initiation reference and when the fuel temperature exceeds a second predetermined protection initiation temperature.

7. A common rail fuel injection control system that is configured such that fuel inside a fuel tank is pressurized and pressure-fed by a high pressure pump and accumulated in a common rail and the high pressure fuel is supplied to injectors that are connected to the common rail to enable fuel injection by the injectors and which includes an electronic control unit that controls operation of the high pressure pump and the injectors, wherein the electronic control unit is configured to periodically determine whether or not one or plural judgment indicators that have been determined beforehand exceed respective predetermined references and, each time the determination result is obtained, increase or decrease a count value of a determining counter in accordance with the determination result, determine whether or not the count value after the increase or decrease exceeds a predetermined protection initiation reference, and when it is determined that the count value exceeds the predetermined protection initiation reference, determine whether or not the fuel temperature exceeds a predetermined protection initiation temperature, and when it is determined that the fuel temperature exceeds the predetermined protection initiation temperature, perform limitation of the fuel injection amount and the rail pressure until the count value falls below the predetermined protection initiation reference.

8. The common rail fuel injection control system according to claim 7, wherein the judgment indicators are at least engine rotational speed, vehicle velocity and rail pressure, and when it is determined that these judgment indicators exceed the respective predetermined references, the electronic control unit increases the count value of the determining counter, and when it is determined that the judgment indicators fall below the respective predetermined references, the electronic control unit decreases the count value of the determining counter.

9. The common rail fuel injection control system according to claim 8, wherein the increased or decreased value of the count value of the determining counter is determined on the basis of the outside air temperature and the water temperature of engine cooling water.

10. The common rail fuel injection control system according to claim 9, wherein the limitation of the fuel injection amount regulates fuel injection operation of the injectors such that the fuel injection amount of the injectors does not exceed an injection amount limit value that is determined on the basis of the engine rotational speed and the fuel temperature, and the limitation of the rail pressure regulates operation of the high pressure pump such that the rail pressure does not exceed a rail pressure limit value that is determined on the basis of the engine rotational speed and the fuel temperature.

11. The common rail fuel injection control system according to claim 10, wherein the electronic control unit performs the limitation of the fuel injection amount and the rail pressure and corrects, by a coefficient that is determined on the basis of the engine rotational speed and the difference between a target value of the rail pressure in a normal control state and the rail pressure limit value, a smoke limit value that is a fuel injection amount that is injectable as a limit value where smoke occurs.

12. The common rail fuel injection control system according to claim 11, wherein the electronic control unit performs the limitation of the fuel injection amount and the rail pressure when it is determined that the count value of the determining counter does not exceed the predetermined protection initiation reference and when it is determined that the fuel temperature exceeds a second predetermined protection initiation temperature.

13. An injector protection control program that is executed in an electronic control unit of a common rail fuel injection control system that is configured such that fuel inside a fuel tank is pressurized and pressure-fed by a high pressure pump and accumulated in a common rail and the high pressure fuel is supplied to injectors that are connected to the common rail to enable fuel injection by the injectors and which includes the electronic control unit that executes drive control of the high pressure pump and the injectors, the injector protection control program comprising the steps of:

determining whether or not one or plural judgment indicators that have been determined beforehand exceed respective predetermined references;

increasing a count value of a determining counter by a predetermined value when it is determined that the one or plural judgment indicators that have been determined beforehand exceed the respective predetermined references;

decreasing the count value of the determining counter by a predetermined value when it is determined that the one or plural judgment indicators that have been determined beforehand do not exceed the respective predetermined references;

determining whether or not the count value after the increase or decrease of the count value of the determining counter exceeds a predetermined protection initiation reference;

determining whether or not the fuel temperature exceeds a predetermined protection initiation temperature when it is determined that the count value after the increase or decrease of the count value of the determining counter exceeds the predetermined protection initiation reference; and performing limitation of the fuel injection amount and the rail pressure until the count value of the determining counter falls below the predetermined protection initiation reference when it is determined that the fuel temperature exceeds the predetermined protection initiation temperature.

14. The injector protection control program according to claim 13, wherein the judgment indicators are at least engine rotational speed, vehicle velocity and rail pressure.

15. The injector protection control program according to claim 14, wherein the increased or decreased value of the count value of the determining counter is determined on the basis of the outside air temperature and the water temperature of engine cooling water.

16. The injector protection control program according to claim 15, wherein the limitation of the fuel injection amount regulates fuel injection operation of the injectors such that the fuel injection amount of the injectors does not exceed an injection amount limit value that is determined on the basis of the engine rotational speed and the fuel temperature, and the limitation of the rail pressure regulates operation of the high pressure pump such that the rail pressure does not exceed a rail pressure limit value that is determined on the basis of the engine rotational speed and the fuel temperature.

17. The injector protection control program according to claim 16, further comprising, when it is determined that the fuel temperature exceeds the predetermined protection initiation temperature, the step of correcting, by a coefficient that is determined on the basis of the engine rotational speed and the difference between a target value of the rail pressure in a normal control state and the rail pressure limit value, and until the count value of the determining counter falls below the predetermined protection initiation reference, a smoke limit value that is a fuel injection amount that is injectable as a limit value where smoke occurs.

18. The injector protection control program according to claim 17, further comprising the steps of determining whether or not the fuel temperature exceeds a second protection initiation reference when it is determined that the count value after the increase/decrease of the count value of the determining counter does not exceed the predetermined protection initiation reference, and performing limitation of the fuel injection amount and the rail pressure when it is determined that the fuel temperature exceeds the second protection initiation reference.

* * * * *